Feb. 18, 1969  S. B. WELCH  3,428,785
SOLID STATE OVEN TEMPERATURE CONTROL
Filed May 26, 1966  Sheet 2 of 2

INVENTOR.
STANLEY B. WELCH
BY *Richard L. Cashin*
HIS ATTORNEY

United States Patent Office 3,428,785
Patented Feb. 18, 1969

3,428,785
SOLID STATE OVEN TEMPERATURE CONTROL
Stanley B. Welch, Louisville, Ky., assignor to General Electric Company, a corporation of New York
Filed May 26, 1966, Ser. No. 553,207
U.S. Cl. 219—501
Int. Cl. H05b 1/02
10 Claims The present invention relates to a control circuit and more particularly to a temperature regulating control circuit.

The present invention may be used as a control circuit in such heating devices as ranges, ovens, or any heating systems where predetermined temperatures are to be maintained within relatively narrow limits once they have been established. In the prior art, temperature maintenance has been achieved through the use of mechanical devices such as bimetal sensing elements or hydraulic bulb and bellows assemblies. The difficulties in calibrating and maintaining these mechanical devices have led to their replacement by solid-state temperature control systems such as those disclosed in the co-pending application Ser. No. 291,896 by P. R. Staples and D. S. Heidtman, filed July 1, 1963, now Patent No. 3,277,280, and assigned to the same assignee as the present invention.

It is one object of the present invention to provide a temperature regulating control circuit which functions both at normal cooking temperatures and at elevated temperatures used for heat cleaning electric ovens.

It is another object of the present invention to provide a temperature regulating control circuit which, when used in the heat cleaning mode, causes power to be applied to a heating element at less than a maximum rate after a predetermined temperature is reached, thereby preventing overshooting or overheating.

To fulfill these and other objects of the invention, there is provided in one embodiment a control circuit which is operable in either a normal cooking mode or in a heat cleaning mode. The crcuit is adapted to be connected to a voltage source and includes a relay actuating means in circuit with a controllable switching means capable of assuming a conducting state during which the actuating means is energized or a non-conducting state during which the actuating means is de-energized. The circuit further includes active means connected to a temperature dependent biasing means and operable to determine the state of the controllable switching means. The temperature dependent biasing means includes a first resistive portion, the magnitude of which is proportional to the temperature to be controlled. The biasing means also includes a first impedance system for use during the normal cooking mode and a second impedance system for use during the heat cleaning mode. A switch means, interposed between the first resistive portion and the first and second impedance systems may be used to selectively connect the first resistive portion to either of the impedance systems depending upon which mode the control circuit is to operate in.

While the specification concludes with claims particularly pointing out and distinctly claiming that which is regarded as the present invention, the organization, advantages, and further objects of that invention may be more readily ascertained from the following detailed description when read in conjunction with the accompanying drawings in which:

Figure 1:
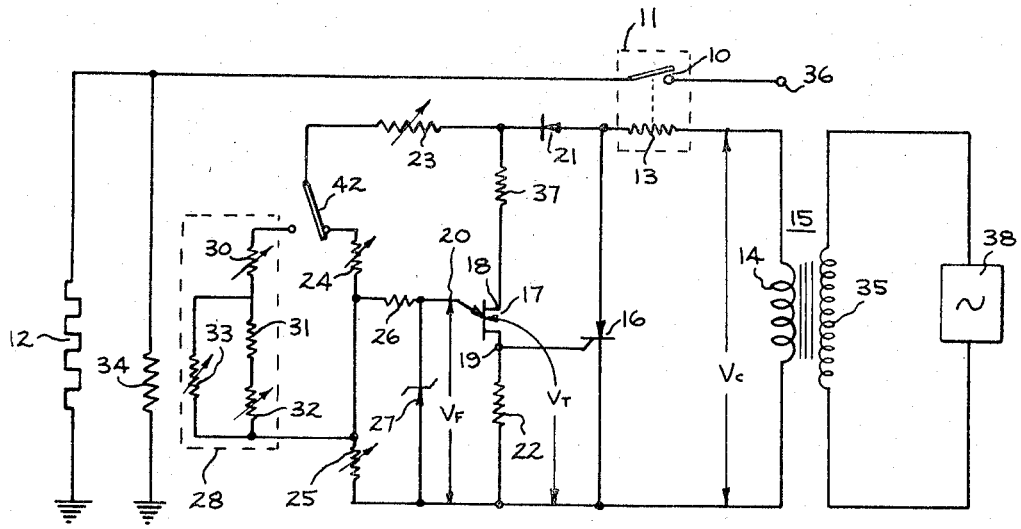
FIGURE 1 is a schematic diagram of a preferred embodiment of the present invention.

Referring now to the drawings, FIGURE 1 is a schematic diagram of a circuit which operates to selectively close the contacts 10 of a hot wire relay 11 so as to regulate the power supplied from a voltage source 36 to a heating unit 12 in, for example, an electric oven. The relay 11 includes a low resistance actuator 13 which when continuously energized causes contacts 10 to remain in their closed or conducting position. If the actuator 13 is de-energized, the contacts 10 of the relay 11 return to their normally open, non-conducting position. The actuator 13 is connected from the upper end of a secondary winding 14 of a stepdown transformer 15 to the anode of a silicon controlled rectifier 16, the cathode of which is directly connected to the lower end of the secondary winding 14. A conduction control circuit for the SCR 16 includes a unijunction transistor 17 having a first base terminal 18, a second base terminal 19, and an emitter terminal 20. A diode 21 has its cathode connected to the first base terminal 18 through a resistor 37 and its anode connected to the junction of the actuator 13 and the anode of the SCR 16. The second base terminal of the transistor 17 is connected both to the gate terminal of the SCR 16 and to the upper end of a resistor 22 having its lower end connected to the lower end of the secondary winding 14.

The conduction of the transistor 17 and the SCR 16 are ultimately controlled by a voltage divider which includes a resistor of sensor 23; i.e., a temperature sensitive resistor having a positive temperature coefficient of resistance. For purposes of illustration, the sensor 23 is assumed to be sensitive to temperatures in the electric oven. During normal cooking operations, the sensor 23 is connected to the cathode of diode 21 at one end and through a switch 42 to a variable resistor 24 at its other end. The variable resistor 24 is coupled to an appropriately calibrated control knob (not shown) and is used to set the oven temperature to be maintained. The lower end of resistor 24 is connected to a calibrating resistor 25 which, in turn, is connected to the lower end of the secondary winding 14. A current limiting resistor 26 is connected from the emitter terminal 20 of the transistor 17 to the junction between the variable resistor 24 and the calibrating resistor 25. A breakdown device or Zener diode 27 is connected between the emitter terminal 20 of the transistor 17 and the lower end of the secondary winding 14. This device is used to limit the magnitude of voltage which may be applied between the emitter terminal 20 and the lower end of secondary winding 14. It has no effect on the circuit until the voltage between terminal 20 and the lower end of winding 14 reaches a breakdown voltage, the magnitude of which is dictated by the physical structure of the diode. When the applied voltage exceeds the breakdown voltage, the diode starts conducting and holds the applied voltage at the level of the breakdown voltage. When the applied voltage drops below the breakdown voltage, the diode ceases to have any effect.

At the beginning of a cooking operation, a voltage from a suitable A-C source 38 is applied across a primary winding 35 of the transformer 15. On positive half-cycles, a voltage $V_c$ established across the secondary winding 14 causes current flow through the actuator 13, the diode 21, and the resistors 23, 24 and 25 provided the SCR 16 is not conducting. Since the unijunction transistor 17 has an interbase resistance of several thousand ohms when it is not conducting, only a small amount of current flows through resistors 37 and 22 and the transistor 17. As the secondary voltage $V_c$ increases during the positive half cycle, it causes an increasing current flow through the voltage divider consisting of resistors 23, 24 and 25. The current flowing through resistor 25 establishes a voltage differential $V_f$ between the emitter terminal of the transistor 17 and the lower end of the resistor 22. Before the transistor 17 can conduct, the voltage differential $V_f$ must exceed a reversing voltage $V_t$ which is equal to the sum of the voltage drop across the resistor 22 ($V_{22}$) plus a breakdown voltage measured between the emitter terminal 20 and the second base terminal 19. As is well known in the art, this latter quantity is equal to a constant ($K_1$) plus the product of the intrinsic standoff ratio ($n$) of the transistor 17 times the voltage between the two base terminals ($V_{bb}$). In formula form $$V_T = V_{22} + K_1 + nV_{bb}.$$

Figure 2:
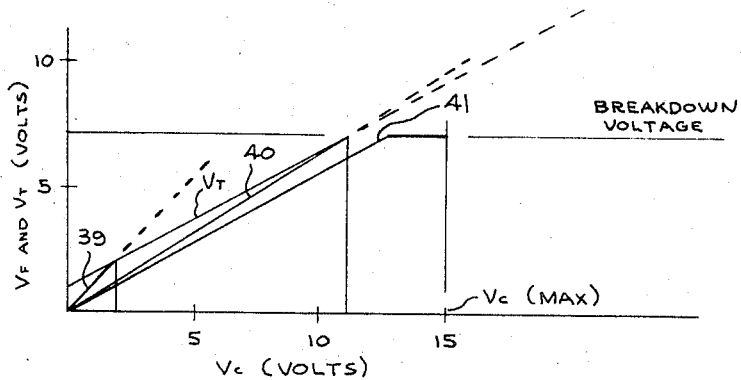
FIGURE 2 is a graph showing voltages in the embodiment of FIGURE 1 as a function of temperature.

For a given unijunction transistor, the intrinsic standoff ratio is a constant. Since $V_{22}$ and $V_{bb}$ are directly related to the current flowing through these elements, $V_t$ may be expressed as a function of current or as a function of the current—establishing secondary voltage $V_c$. This is graphically shown in FIGURE 2 where $V_t$ is plotted as a function of the secondary voltage $V_c$. $V_t$ varies directly with $V_c$, but always exceeds $V_c$ by at least the value of $K_1$ which is independent of applied voltages and is determined by the physical structure of the transistor 17.

As was mentioned before the transistor 17 will not conduct until the voltage $V_f$ exceeds the reversing voltage $V_t$. At voltages below the breakdown voltage of the Zener diode 27, $V_f$ is proportional to the value of the resistor 25 divided by the sums of the values of resistors 23, 24, and 25. In other words, $V_f$ is proportional to $$\frac{R_{25}}{R_{23}+R_{24}+R_{25}}$$

For practical purposes, $$V_f = \frac{R_{25}}{R_{23}+R_{24}+R_{25}} V_c$$

since the value of low resistance actuator 13 is quite small compared to the value of the other resistors in the circuit. At the start of a cooking operation, the sensor 23 is cool and its resistance is at a minimum value. Since the value of resistors 24 and 25 are constant during a cooking operation, the ratio $$\frac{R_{25}}{R_{23}+R_{24}+R_{25}}$$

is at its maximum value at the start and $V_f$ closely corresponds to $V_c$. Referring again to FIGURE 2, the variation of $V_f$ with $V_c$ at an extremely low temperature is shown by a line 39. It is seen that $V_f$ exceeds $V_t$ early in the positive half cycle of $V_c$ at low temperatures so that the transistor 17 is quickly rendered conductive on each positive half cycle. As the transistor 17 starts to conduct, its resistance drops from several thousand ohms to a few ohms so that a portion of the current established by the secondary voltage $V_c$ is diverted from the voltage divider to a path through the resistors 37 and 22 and the transistor 17. Increased current flow through resistor 22 results in a positive voltage applied at the gate terminal of the SCR 16. Since the anode of the SCR 16 is already positive with respect to the cathode during the positive half cycles of $V_c$, the positive gate voltage causes the SCR to switch into its conducting state, thereby effectively short circuiting the transistor 17 and the voltage divider. When the SCR 16 starts conducting, the voltage $V_c$ is applied primarily across the actuator 13 and the actuator 13 causes the contacts 10 of the relay 11 to drop into their closed position to connect the heating unit 12 to the power source 36.

Of course, on negative half cycles of $V_c$ both the diode 21 and the SCR 16 are reverse biased and non-conducting. Although the actuator 13 is not energized during the negative half cycles, the mechanical inertia of the relay 11 prevents the contacts 10 from dropping out of their closed position. The opening of the contacts 10 can take place only when the actuator 13 is de-energized during both positive and negative half cycles. Accordingly, the contacts 10 remain closed and the heating unit 12 is continuously energized during the initial phases of the cooking operation.

As the temperature in the oven increases, the magnitude of the resistance of the sensor 23 also increases thereby decreasing the value of the ratio of the resistor 25 to the sum of the resistors 23, 24 and 25 and correspondingly the values of $V_f$ relative to $V_c$. Until the temperature of the oven exceeds a certain magnitude, the ratio of the resistors remain above a critical level; i.e., $V_f$ exceeds $V_c$, and the actuator 17 conducts during part of each positive half cycle. By varying the values of resistors 24 and 25, the critical level may be made to occur at different temperatures. Once the oven is in domestic use, the critical level is established by setting the value of the resistor 24 at the beginning of the cooking operation through its calibrated control knob.

Before the oven is put into domestic use, the manufacturer may calibrate the circuit to assure that the critical level does occur at the temperature indicated on the control knob by subjecting the sensor 23 to an accurately controlled temperature while setting the control knob to indicate the controlled temperature. Then the manufacturer may determine if the transistor 17 is conducting. If transistor 17 is conducting the value of the resistor 25 is decreased until the transistor 17 just ceases to conduct. Conversely, if transistor 17 is not conducting, the value of resistor 25 is increased until transistor 17 is conducting. Then the value of resistor 25 is decreased as before until the transistor 17 just ceases to conduct. Once this calibration has been accomplished, the value of resistor 25 is not changed. The effect of the Zener diode 27 on $V_f$ is shown by the line 41 in FIGURE 2 which represents the voltage $V_f$ as a function of $V_c$ at temperatures above the critical level. It will be seen that the voltage $V_f$ denoted by line 41 rises to the breakdown voltage but remains constant at that voltage. The use of the Zener diode 27 stabilizes the voltage at which the transistor 17 conducts.

Once the value of the ratio of resistors falls below a critical level, neither the transistor 17 nor the SCR 16 conducts, and only negligible current passes through the actuator 13. As a result, practically no heat is generated by the actuator 13. After several seconds, the contacts 10 drop open thus breaking the connection between the voltage source 36 and the heating unit 12. As a consequence, the temperature of the oven starts to decrease as does the magnitude of the resistance of sensor 23. After the oven temperature decreases a certain amount, the relative magnitudes of the sensor 23 and the resistors 24 and 25 change sufficiently to raise the magnitude of the ratio of resistors above the critical level. The transistor 17 and the SCR 16 then start conducting on positive half cycles of the supply voltage as they did before and the contacts 10 close to reconnect the heating unit 12 to the power source 36.

The temperature in the oven will cycle about the critical temperature level for an indefinite period. While the instantaneous oven temperature should remain somewhat near the critical temperature level, it should not cycle rapidly about that level since the frequent opening and closing of the contacts 10 tends to wear them out. If the magnitude of the sensor 23 were determined solely by the instantaneous temperature in the oven, the rapid cycling would inevitably occur since the transistor 17 would conduct whenever the oven temperature fell even slightly below the critical level, but would not conduct if the temperature even slightly exceeded the critical level. To prevent the rapid cycling, the self-heating characteristics of the sensor 23 are utilized in the following manner.

When the temperature to which the sensor 23 is subjected is below the critical temperature, the transistor 17 becomes conductive early in each positive half cycle of the secondary voltage $V_c$. As a result, the voltage divider is quickly short circulated and little current passes through the sensor 23. However, when the temperature reaches the critical level, transistor 17 and SCR 16 stop conducting. Since the voltage divider is no longer short circuited, current passes through the sensor 23 on the entire positive half cycle. The current results in self-heating of the sensor 23 which effectively increases its magnitude to a higher level than that caused by the oven temperature alone. Due to this self-heating, the magnitude of the sensor resistor 23 decreases more slowly than the temperature of air in the oven. The transistor 17 starts to conduct only when the air temperature in the oven falls to a level at which the magnitude of the self-heated sensor 23 has become small enough and the voltage drop across the resistor 25 large enough to forward bias the emitter terminal 20 of the transistor 17. Naturally, this occurs at a temperature level somewhat below the level at which transistor 17 stopped conducting since the effect of the self-heating results in sensor 23 having a larger magnitude than if it were responsive solely to oven air temperature.

Once the transistor 17 begins to conduct again, the sensor 23 is again subjected to current only during the early part of each positive half cycle. Thus, the sensor 23 ceases to be self-heating and is responsive to oven air temperatures alone until the oven heats up to the critical temperature level. The sensor 23 again is subjected to current during the entire positive half cycle.

To adapt the above-described circuit for use during heat cleaning operations, a second impedance system or shunt circuit 28 is connected into the circuit in place of the variable resistor 24 by moving a first set of contacts on the switch 42 to their second position. In a preferred embodiment, the shunt circuit 28 includes a calibrating resistor 30, a fixed resistor 31, a first variable resistor 32 having a negative temperature coefficient of resistance and a second variable resistor 33 having a positive temperature coefficient of resistance. The variable resistor 32 is sensitive only to the ambient temperature of resistor 33. The variable resistor 33 is connected across the series combination of resistors 31 and 32 and the resulting parallel combination is further connected in series with the calibrating resistor 30. The resistor 33 is thermally isolated from the oven so that its magnitude is independent of oven temperatures, but is instead a function of the heat generated by a power resistor 34 which is thermally isolated from both the heating unit 12 and the oven. The power resistor 34 is connected to the source 36 in parallel with the oven heating unit 12. The heat generated by the power resistor 34 is indicative of the average power delivered to the heating unit 12.

The combination of resistors within the shunt circuit 28 not only serves to adapt the circuit of FIGURE 1 for use at elevated heat cleaning temperatures in the range of 800–900° F., but in a preferred embodiment also provides an anticipation function which prevents the temperature in the oven from rising above a predetermined maximum. For a description of a heat cleaning oven see Patent No. 3,121,158 of Bohdan Hurko which is assigned to the General Electrc Company, assignee of the present invention.

Figure 3:
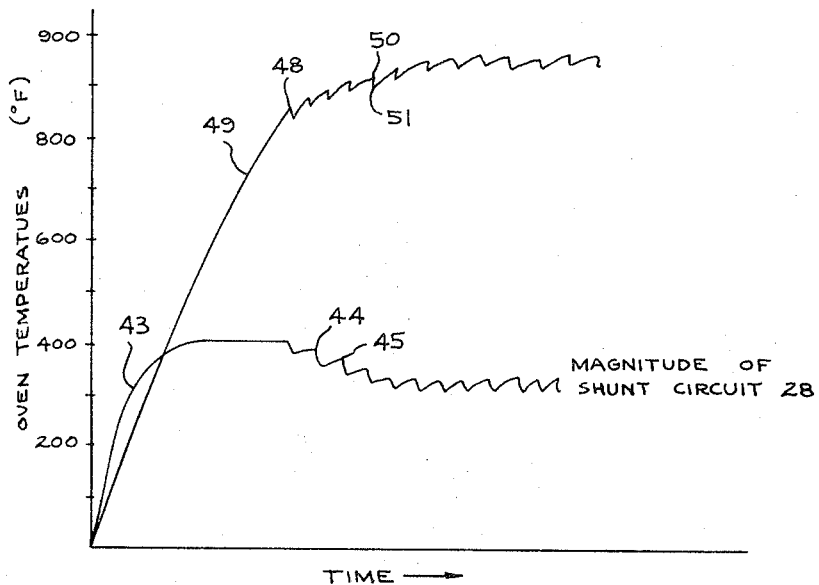
FIGURE 3 is a graph showing oven temperatures versus time as they are affected by the operation of an anticipator circuit included in the embodiment shown in FIGURE 1.

The operation of the circuit during heat cleaning of an electric oven may be made more clear by reference to FIGURE 3 which is a chart of oven temperature as a function of time superimposed upon a chart of the combined magnitude of the shunt circuit resistors, also as a function of time. At the beginning of the heat cleaning operation, the magnitudes of the sensor 23 and the variable resistor 33 are at minimum values since no current has yet been applied to the heating unit 12. However, once the contacts 10 of the relay 11 close due to the continuous energization of actuator 13, the heat generated by the heating unit 12 soon causes an increase in the magnitude of both 12 and 13. Since power is continuously supplied to the heating unit 12 during this time, the power resistor 34 generates maximum heat and resistor 33 rapidly rises to its maximum value along a line 42 shown in FIGURE 4. After a short time, the magnitude of resistor 33 reaches its maximum value and levels off along a line 43. The value of the magnitude of resistor 33 is made dependent solely upon the average power delivered to the heating unit 12 through the use of the variable resistor 32 with its negative temperature coefficient resistance. As the ambient temperature of resistor 33 increases, any resistance increase due to ambient increase is offset by a decrease in the resistance of resistor 32. By properly selecting the resistors 32 and 33 and the fixed resistor 31, the magnitude of the parallel combination of these resistors is made indicative solely of the average power delivered to the heating unit 12.

Power is continuously supplied to the heating unit 12 until the oven temperature reaches a level at which the sum of the magnitudes of the sensor 23 and the shunt circuit 28 reaches a critical level. When the critical level is reached, the transistor 17 and the SCR 16 stop conducting and negligible current passes through the actuator 13. The contacts 10 of the relay 11 drop into their open position thus disconnecting the power source 36 from the heating unit 12 and the power resistor 34. Since the resistor 34 generates no heat, the magnitude of resistor 33 in the shunt circuit 28 drops rapidly. However, the magnitude of the sensor 23 does not fall nearly as rapidly due to its self-heating and to the relatively slow cooling rate of the oven. When the combination of the magnitudes of sensor resistor 23 and the resistors in shunt circuit 28 falls below its critical level, transistor 17 and SCR 16 start to conduct and eventually cause the heating unit 12 and the power resistor 34 to be reconnected to power source 36. Since the magnitude of the sensor 23 will not have decreased as much as the magnitude of the resistor 33 in the shunt circuit 28, reapplying power to the heating unit 12 results in an increase in oven temperature which causes the magnitude of the sensor resistor 23 to change to a higher value and the magnitude of the shunt circuit 28 to a lower value before the critical level is reached.

In FIGURE 3, this lower critical level is represented by a point 44 on the shunt circuit magnitude curve. When the critical level is reached this time, the contacts 10 of the relay 11 again open to disconnect the power source 36 from the heating unit 12 and the power resistor 34. As before, the value of the resistor 33 in the shunt circuit 28 drops as does the magnitude of the sensor 23 until the combination of the two falls to the level at which the transistor 17 and the SCR 16 again conduct. Since the magnitude of the sensor 23 will have not fallen as much as the magnitude of resistor 33, just as before, the magnitude of the shunt circuit 28 needs only to increase to a lower level 45 before the critical level of the circuit is again reached. The gradual buildup of temperatures in the oven continues until a level is reached at which the average power input to the oven is sufficient to balance the heat losses from the oven. At this point, the magnitude of sensor 23 will fall to the same extent as the magnitude of resistor 33 and their periodic reheating serves only to maintain the oven temperature at a constant average value.

The resistor 30 has been provided to allow calibration of the circuit for use during heat cleaning operations. To carry out the calibration of the heat cleaning circuit, the heating unit 12 is continuously energized until a temperature of about 840° F. (40° below the final heat cleaning temperature) is reached. Before this temperature is reached, the magnitude of the resistor 33 will have reached its maximum value. In order to establish a critical level at this temperature, the value of the resistor 30 is varied by the manufacturer until the transistor 17 and SCR 16 stop conducting at temperatures even slightly in excess of the accurately controlled temperature. This assures that the gradual buildup of temperatures begins well below the maximum temperature to which the oven structure should be subjected.

The use of the shunt circuit 28 ensures that the temperature in the oven will rise at a maximum rate only until a temperature of approximately 840° F. is reached. In FIGURE 3, this is represented by the point 48 on line 49. At point 48, the oven temperature starts cycling as the transistor 17 and SCR 16 switch from their conducting to their non-conducting conditions at the high points 50 and from their non-conducting to their conducting conditions at the low points 51. As the heat losses begin to match the input heat, the temperature of the oven stabilizes around 880° F. where it remains until the cleaning operation is terminated.

Figure 4:
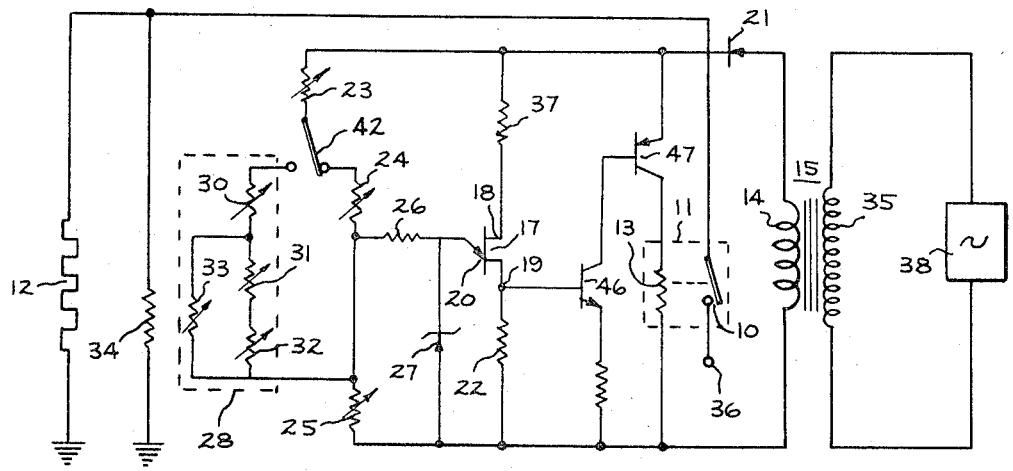
FIGURE 4 is a schematic diagram of an alternative embodiment of the present invention.

Of course, certain elements in the disclosed circuits may be replaced by equivalents without falling outside the true scope of the invention. For instance, in FIGURE 4, there is shown a circuit in which the SCR 16 has been replaced by a pair of cascaded transistors 46 and 47. The purpose of this cascaded arrangement is to assure that the transistor 47 will be driven into a highly conductive condition whenever the transistor 17 conducts. The actuator 13 is then connected directly across the secondary winding 14 of the supply transformer 15. Since the remainder of the circuit functions in the same manner as the previously discussed circuits, no further discussion of FIGURE 4 is required.

While the preceding paragraphs describe what are at present regarded as preferred embodiments of the present invention, many variations and modifications may occur to those skilled in the art. Therefore, it is intended that the appended claims shall cover all such variations and modifications as fall within the true spirit and scope of the invention.

What I claim as new and desire to secure by Letters Patent of the United States is:

1. A control circuit for a load circuit which includes relay contacts in circuit with heating means and a power source, said control circuit being adapted to be connected to a voltage source and including:
    (a) actuating means;
    (b) controllable switching means in a circuit with said actuating means and capable of assuming a conductive state during which said actuating means is energized or a non-conducting state during which said actuating means is de-energized;
    (c) active means having conductive and non-conductive modes of operation for controlling the state of said controllable switching means; and
    (d) temperature dependent biasing means for determining the mode of operation of said active means, said biasing means including:
        (1) a first resistive portion having a magnitude proportional to the temperature being sensed,
        (2) a first impedance circuit for use in a normal cooking mode,
        (3) a second impedance circuit for use in a heat cleaning mode, and
        (4) switch means for selectively connecting said first resistive portion to said first impedance circuit or to said second impedance circuit to establish the mode in which the circuit is to function.

2. A control circuit as recited in claim 1 wherein said first resistive portion has a magnitude which is directly proportional to the temperature being sensed.

3. A control circuit as recited in claim 1 wherein said controllable switching means comprises a single solid-state device having a first terminal connected to said actuating means, a second terminal adapted to be connected to the voltage source, and a control terminal connected in circuit with said active device.

4. A control circuit as recited in claim 1 wherein said second impedance circuit includes a first resistor having a magnitude proportional to the average power delivered to the heating element in the associated load circuit and to its own ambient temperature, and a second resistor having a magnitude inversely proportional to the ambient temperature of said first resistor, said first and said second resistors being connected in parallel whereby the magnitude of the parallel combination depends only on the average power delivered to the heating element.

5. A control circuit as recited in claim 2 wherein said second impedance circuit includes a first resistor having a magnitude proportional to the average power delivered to the heating element in the associated load circuit and to its own ambient temperature, and a second resistor having a magnitude inversely proportional to the ambient temperature of said first resistor, said first and said second resistors being connected in parallel whereby the magnitude of the parallel combination depends only on the average power delivered to the heating element.

6. A control circuit as recited in claim 3 wherein said second impedance circuit includes a first resistor having a magnitude proportional to the average power delivered to the heating element in the associated load circuit and to its own ambient temperatures, and a second resistor having a magnitude inversely proportional to the ambient temperature of said first resistor, said first and said second resistors being connected in parallel whereby the magnitude of the parallel combination depends only on the average power delivered to the heating element.

7. A control circuit as recited in claim 4 wherein said active means comprises a solid-state device having a control terminal connected to said temperature dependent biasing means in such a way that said active means is rendered conductive upon the attainment of a predetermined temperature.

8. A control circuit as recited in claim 7 and further including breakdown means electrically connected to said control terminal of said active means to limit the magnitude of voltage which may be applied to said control terminal.

9. A heating system which provides and maintains temperatures at either normal levels or at elevated levels, said system comprising:
    (a) a load circuit including:
        (1) an electric heating element,
        (2) a power source for energizing said heating element,
        (3) a relay means having relatively movable contacts in circuit with said power source and said heating element for selectively connecting said heating element to said power source;
    (b) a control circuit responsive to temperatures caused by the energization of said heating element and including:
        (1) actuating means which when energized causes the relatively movable contacts of said relay means to move toward their closed position,
        (2) controllable switching means in circuit with said actuating means and capable of assuming a conductive state during which said actuating means is energized,
        (3) active means electrically connected to said controllable switching means and having a conductive mode of operation during which said controllable switching means assumes its conductive state,
        (4) temperature dependent biasing means for determining the mode of operation of said active means and said biasing means including a first resistive portion having variable magnitude, a first impedance circuit for use for maintaining temperatures at a normal level, a second impedance circuit for use while maintaining temperatures at elevated levels, and switch means for selectively connecting said first resistive portion to said first impedance circuit or to said second impedance circuit to establish the mode in which the system is to function.

10. A heating system as recited in claim 9 wherein said second impedance circuit includes a first resistor having a magnitude proportional to the average power delivered to said heating element in said load circuit and to its own ambient temperature, and a second resistor having a magnitude inversely proportional to the ambient temperature of said first resistor, said first and said second resistors being connected in parallel whereby the magnitude of the parallel combination depends only on the average power delivered to the heating element.

References Cited

UNITED STATES PATENTS

| | | | |
|---|---|---|---|
| 3,149,224 | 9/1964 | Horne et al. | 219—501 |
| 3,254,838 | 6/1966 | Chambers | 219—494 |
| 3,374,337 | 3/1968 | Burley | 219—501 |

BERNARD A. GILHEANY, *Primary Examiner.*

FRED E. BELL, *Assistant Examiner.*